(12) United States Patent
Kuroda et al.

(10) Patent No.: US 9,582,969 B2
(45) Date of Patent: Feb. 28, 2017

(54) METHOD AND DEVICE FOR PROVIDING ALLOTTED GAME ITEMS FROM DECKS HAVING RARE ITEMS

(71) Applicant: DeNA Co., Ltd., Tokyo (JP)

(72) Inventors: Ryo Kuroda, Tokyo (JP); Yujiro Uetani, Tokyo (JP); Yuki Machida, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/750,574

(22) Filed: Jun. 25, 2015

(65) Prior Publication Data
US 2015/0379824 A1    Dec. 31, 2015

(30) Foreign Application Priority Data

Jun. 27, 2014 (JP) .................. 2014-132164

(51) Int. Cl.
*A63F 13/822* (2014.01)
*G07F 17/32* (2006.01)
*A63F 13/55* (2014.01)
*A63F 13/70* (2014.01)
*A63F 13/45* (2014.01)
*A63F 13/69* (2014.01)

(52) U.S. Cl.
CPC .......... *G07F 17/3293* (2013.01); *A63F 13/45* (2014.09); *A63F 13/55* (2014.09); *A63F 13/69* (2014.09); *A63F 13/70* (2014.09); *A63F 13/822* (2014.09); *G07F 17/326* (2013.01); *G07F 17/329* (2013.01)

(58) Field of Classification Search
None
See application file for complete search history.

(56) References Cited

U.S. PATENT DOCUMENTS

| 2009/0005144 A1* | 1/2009 | Moody ............... G07F 17/3293 463/13 |
| 2013/0324209 A1 | 12/2013 | Kishimoto et al. |
| 2015/0011281 A1 | 1/2015 | Kishimoto et al. |

FOREIGN PATENT DOCUMENTS

| JP | 2008-093165 A | 4/2008 |
| JP | 5086491 B1 | 11/2012 |
| JP | 5335969 B1 | 11/2013 |
| JP | 2013-247977 A | 12/2013 |
| JP | 2014-090880 A | 5/2014 |

OTHER PUBLICATIONS

Non-Final Office Action issued in Japanese Patent Application No. 2014-132164, dated Jan. 6, 2015.

* cited by examiner

Primary Examiner — Lawrence Galka
(74) Attorney, Agent, or Firm — Pillsbury Winthrop Shaw Pittman LLP

(57) ABSTRACT

To motivate a user to obtain game items from another deck after the user has obtained desired game items, a system according to an embodiment of the disclosure includes one or more processors and a storage storing information about a finite number of game items included respectively in a first deck and a second deck allocated to a user. The one or more processors select a first allotted count of game items as first allotted game items from among game items in the first deck in response to an acquisition request from the user, and select a second allotted count of game items as second allotted game items from among game items in the second deck in response to the acquisition request from the user.

8 Claims, 8 Drawing Sheets

Deck Identification Information: B000001 ( Deck B1 )

| Game Item Identification Information | Rarity Value | Name | Total Number | Remaining Number |
|---|---|---|---|---|
| I000001 | 1 | Card A | 50 | 32 |
| I000002 | 2 | Card B | 30 | 21 |
| I000003 | 3 | Card C | 10 | 9 |
| I000004 | 4 | Card D | 1 | 1 |
| I000005 | 1 | Card E | 50 | 29 |

Deck Identification Information: B100001 ( Deck B2 )

| Game Item Identification Information | Rarity Value | Name | Total Number | Remaining Number |
|---|---|---|---|---|
| I000001 | 1 | Card A | 50 | 41 |
| I000011 | 2 | Card G | 30 | 26 |
| I000012 | 3 | Card H | 10 | 9 |
| I000013 | 4 | Card I | 1 | 1 |
| I000014 | 1 | Card J | 50 | 40 |

| User Identification Information | Deck Identification Information 1 | Deck Identification Information 2 |
|---|---|---|
| 000001 | B000001 | B100001 |
| 000002 | B000002 | B100002 |
| 000003 | B000003 | B100003 |
| 000004 | B000004 | B100004 |
| 000005 | B000005 | N/A |
| ... | ... | ... |

Fig. 2

| Deck Identification Information: B000001 ( Deck B1 ) | | | | |
|---|---|---|---|---|
| Game Item Identification Information | Rarity Value | Name | Total Number | Remaining Number |
| I000001 | 1 | Card A | 50 | 32 |
| I000002 | 2 | Card B | 30 | 21 |
| I000003 | 3 | Card C | 10 | 9 |
| I000004 | 4 | Card D | 1 | 1 |
| I000005 | 1 | Card E | 50 | 29 |

| Deck Identification Information: B100001 ( Deck B2 ) | | | | |
|---|---|---|---|---|
| Game Item Identification Information | Rarity Value | Name | Total Number | Remaining Number |
| I000001 | 1 | Card A | 50 | 41 |
| I000011 | 2 | Card G | 30 | 26 |
| I000012 | 3 | Card H | 10 | 9 |
| I000013 | 4 | Card I | 1 | 1 |
| I000014 | 1 | Card J | 50 | 40 |

Fig. 3

| User Identification Information | Owned Item 1 | | Owned Item 2 | | Owned Item 3 | | Owned Item 4 | | Owned Item 5 | |
|---|---|---|---|---|---|---|---|---|---|---|
| | ID | No. of pcs | ID | No. of pcs | ID | No. of pcs | ID | No. of pcs | ID | No. of pcs |
| 000001 | I000001 | 8 | I000002 | 5 | I000003 | 1 | I000005 | 6 | N/A | 0 |
| 000002 | I000002 | 3 | I000003 | 1 | I000006 | 4 | I000009 | 3 | I000006 | 1 |
| 000003 | I000001 | 12 | I000002 | 6 | I000004 | 1 | I000006 | 3 | N/A | 0 |
| 000004 | I000002 | 8 | I000003 | 2 | I000005 | 9 | N/A | 0 | N/A | 0 |
| 000005 | I000001 | 7 | I000002 | 10 | I000003 | 1 | N/A | 0 | N/A | 0 |
| ... | ... | | ... | | ... | | ... | | ... | |

Fig. 4

METHOD AND DEVICE FOR PROVIDING ALLOTTED GAME ITEMS FROM DECKS HAVING RARE ITEMS

CROSS-REFERENCE TO RELATED APPLICATIONS

This application is based on and claims the benefit of priority from Japanese Patent Application Serial No. 2014-132164 (filed on Jun. 27, 2014), the contents of which are hereby incorporated by reference in their entirety.

TECHNICAL FIELD

The present disclosure relates to a system, method and storage medium storing a program for providing game items.

BACKGROUND

Card games are popular in a field of on-line games. In some card games, a user receives an allotted game item selected in response to an acquisition request from the user and the user can use the game item to progress the game.

Selection of the game item to be allotted is performed, for example, based on an allotment probability set for each game item as disclosed in Japanese Patent Application Publication No. 2008-93165 (the "'165 Publication").

Japanese Patent No. 5335969 (the "969 patent") discloses a game system in which a deck of a finite number of game items is allocated to a user, and an allotted game item is selected from among the game items included in the deck allocated to the user in response to an acquisition request for a game item from the user.

The allocation of a deck to each user disclosed in the '969 patent is actually adopted in many card games. In such card games, decks allocated to users are often configured to include a small number of rare items in the deck of each user. Advantageous parameters (for instance, high attack ability) are set in the rare items so users can progress games with advantages by using the rare items. It should be understood that users try to obtain rare items from own decks by using points and virtual currencies which the users have. In such card games, after all the rare items are selected from a deck, a user may often feel there are no more game items which the user wish to obtain in the deck so the deck may be initialized or a new deck is allocated to the user.

Initialized decks and decks newly allocated to users are in initial states. A deck in the initial state includes a small number of rare items and a large number of game items other than the rare items. A probability to win the rare items from the initialized deck is low and users know that they have to consume many points to obtain the rare items. Thus, users to whom the initialized deck is allocated may feel that it is a lot of work to acquire the rare items. The above-described mechanism in which an initialized deck is newly allocated to a user after the user obtains rare items from his/her deck may reduce the user's willingness to obtain rare items after the user obtained desired game items from the deck.

Moreover, there would be no strategy for efficiently obtaining desired game items such as rare items in the above-described conventional selection method of game items. In order to acquire rare items, users only had to increase the number of acquisition requests for game items. Therefore users may tend to get bored with the games because there is no strategy for obtaining rare items.

SUMMARY

An object of the disclosure is to relieve or reduce at least a part of the above problem. An object of the disclosure according to one embodiment is to provide a system, method, and a storage medium storing a program for motivating a user to further obtain game items from another deck after the user obtained desired game items from one deck. Another object of the disclosure according to one embodiment is to make games more attractive by enhancing a strategy for obtaining game items. The other objects of the present disclosure will be apparent with reference to the entire description in this specification.

A system according to an embodiment of the disclosure includes one or more processors and a storage. The system may be a game system providing video games and online games to one or more users. The storage according to an embodiment may store information about a finite number of game items included respectively in a first deck and a second deck allocated to a user. According to an embodiment, the first deck may include a first rare item having a rarity value equal to or higher than a predetermined value, and the second deck may include a second rare item having a rarity value equal to or higher than the predetermined value.

According to an embodiment, one or more processors execute prescribed computer readable instructions to: in response to an acquisition request from the user, select a first allotted count of game items as first allotted game items from among game items in the first deck; remove the game items selected as the first allotted game items from the first deck; in response to the acquisition request from the user, select a second allotted count of game items as second allotted game items from among game items in the second deck; remove the game items selected as the second allotted game items from the second deck; and impart the first and second allotted game items to the user.

According to the embodiment, the allotted game items are selected from each of the first and second decks, and the selected allotted game items are removed from the corresponding decks. Therefore, when the user performs an acquisition request for obtaining a rare item in the first deck and successfully obtains the rare item, a given number of allotted game items are also deleted from the second deck. This feature is also applied to a case where the user performs an acquisition request for obtaining a rare item in the second deck, and when the user successfully obtains the rare item from the second deck, a given number of allotted game items are also deleted from the first deck. In this manner, at the point where the user has obtained all the desired items including the rare items from one of the first deck and the second deck, a predetermined number of game items are removed from other of the first deck and the second deck and consequently the other deck includes a smaller number of game items compared to the number of game items in the deck in the initial state. In other words, when a user has obtained all the desired game items such as rare items from one of the decks, the user is able to use the other deck with a higher allotment probability than that of the initial state since a predetermined number of game items are removed from the deck. Therefore, according to one embodiment of the disclosure, after a user has obtained desired game items from one deck, it is possible to motivate the user to obtain game items from another deck.

According to one embodiment, the one or more processors are configured to determine whether the acquisition request is a first acquisition request for obtaining game items in the first deck or a second acquisition request for obtaining game items in the second deck. In one embodiment, when the acquisition request is the first acquisition request, the first allotted count is larger than the second allotted count. In one embodiment, when the acquisition request is the first acquisition request, the first allotted count is larger than the second allotted count. Moreover, the user can strategically consider to which deck the user should send an acquisition request based on the remaining number of game items in the deck B1 and the deck B2, therefore it is possible to enhance strategic characteristics of the game. For example, when a rare item in the first deck is an important item for the current stage clear, it may be an effective strategy for the user to concentrate acquisition requests on the first deck (the first acquisition requests). Whereas in order to efficiently obtain rare items from both of the first and second decks, it may be an effective strategy to alternately perform an acquisition request for obtaining a game item from the first deck (the first acquisition request) and an acquisition request for obtaining a game item from the second deck (the second acquisition request) in order to reduce game items evenly from the first and second deck. This is because game items are selected from the other deck in response to acquisition requests to one deck and if the other deck becomes empty as games items are intensively obtained from one deck, it is not possible to obtain a game item from the empty deck. Consequently, the number of game items obtainable per a single acquisition request is decreased.

According to one embodiment of the disclosure, the one or more processors execute prescribed computer readable instructions to present, to the user, information indicating a total number of game items included in the first deck in an initial state, information indicating a remaining number of the first rare item, information indicating a total number of game items included in the second deck in an initial state, and information indicating a remaining number of the second rare item. In this manner, the user can consider to which deck the user should perform an acquisition request based on the total number of game items and the number of remaining rare items respectively for the first deck and the second deck.

In the embodiment, the one or more processors may be configured to execute prescribed computer readable instructions to generate another game item based on the first rare item obtained from the first deck and the second rare item obtained from the second deck. In this manner, when a user firstly obtained the first rare item from the first deck, the user is motivated to obtain the second rare item from the second deck in order to obtain a game item that is generated by fusing the two rare items. To the contrary, when the user firstly obtained the second rare item from the second deck, the user is motivated to obtain the first rare item from the first deck.

According to an embodiment of the disclosure, when the acquisition request is the first acquisition request, the second allotted game items are selected such that they do not include the second rare item, and when the acquisition request is the second acquisition request, the first allotted game items are selected such that they do not include the first rare item. In other words, when the user requests to obtain a game item from the first deck, the second allotted game items are selected from among game items other than the second rare item in the second deck. To the contrary, when the user requests to obtain a game item from the second deck, the first allotted game items are selected from among game items other than the first rare item in the first deck. In this way, a user has to perform acquisition requests to the first deck in order to obtain the first rare item and acquisition requests to the second deck in order to obtain the second rare item. Therefore, the user may require determining to which deck the user should perform an acquisition request based on the status of the game and the acquisition status of game items, which enhances strategic characteristics of the game.

According to an embodiment of the disclosure provides a method implemented by executing prescribed computer readable instructions by one or more processors. The method includes storing information about a finite number of game items included respectively in a first deck and a second deck allocated to a user; in response to an acquisition request from the user, selecting a first allotted count of game items as first allotted game items from among game items in the first deck; removing the game items selected as the first allotted game items from the first deck; in response to the acquisition request from the user, selecting a second allotted count of game items as second allotted game items from among game items in the second deck; removing the game items selected as the second allotted game items from the second deck; and imparting the first and second allotted game items to the user.

According to an embodiment of the disclosure, a storage medium storing a program causing one or more computer processors to function as: a unit configured to store information about a finite number of game items included respectively in a first deck and a second deck allocated to a user; and a unit configured to select a first allotted count of game items as first allotted game items from among game items in the first deck in response to an acquisition request from the user; a unit configured to remove the game items selected as the first allotted game items from the first deck; a unit configured to select a second allotted count of game items as second allotted game items from among game items in the second deck in response to the acquisition request from the user; a unit configured to remove the game items selected as the second allotted game items from the second deck; and a unit configured to impart the first and second allotted game items to the user.

According to various embodiments of the disclosure, it is possible to provide a system, method, and a storage medium storing a program for encouraging a user to further obtain game items from another deck after the user obtained desired game items from one deck. Moreover, according to various embodiments it is possible to make games more attractive by enhancing strategic characteristics for obtaining game items.

BRIEF DESCRIPTION OF THE DRAWINGS

FIG. 2 illustrates an example of a management table for storing deck identification information in association with user identification information according to an embodiment of the disclosure.

FIG. 3 illustrates an example of a management table for storing in-deck game item information of game items included in each deck in association with the deck identification information of the deck according to an embodiment of the disclosure.

FIG. 4 shows an example of owned game item management table according to an embodiment of the disclosure.

DESCRIPTION OF THE PREFERRED EMBODIMENTS

Figure 1:
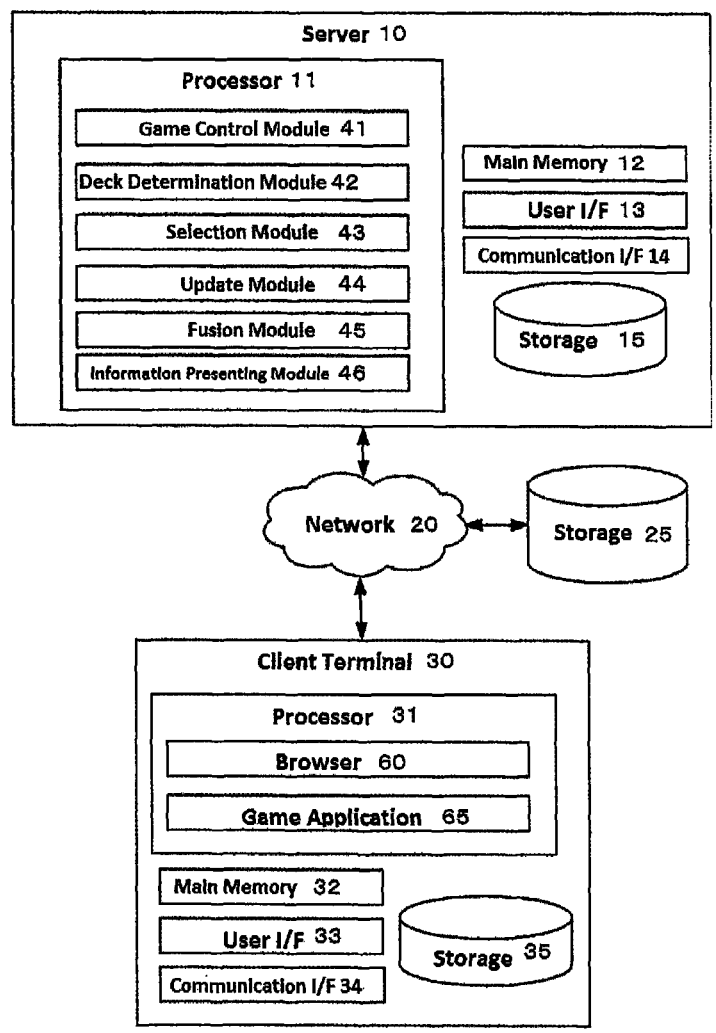
FIG. 1 is a block diagram schematically illustrating a system according to an embodiment of the present disclosure.

Various embodiments of the present disclosure will be described hereinafter with reference to the drawings. In the drawings, the same components are denoted by the same reference numerals.

FIG. 1 is a block diagram schematically illustrating a system according to an embodiment of the disclosure. As shown, the system according to the embodiment of the disclosure may include a server 10 and a client terminal 30. Although FIG. 1 shows only one client terminal 30, the server 10 may be communicatively connected to two or more client terminals 30.

In the embodiment shown in FIG. 1, the server 10 may be communicatively connected to the client terminal 30 via a network 20 such as the Internet and provide the client terminal 30 with various online games. In one embodiment, the server 10 may process a game message received from the client terminal 30 in accordance with a predetermined game logic (or a program to realize the game logic) and may then send the processing results to the client terminal 30. The server 10 may also provide various game data required for progress of the games to the client terminal 30. An example of the online games provided by the server 10 includes card games.

As shown, the server 10 may include a processor 11, a main memory 12, a user I/F 13, a communication I/F 14, and a storage 15. These components may be electrically connected to each other via a bus not shown. The processor 11 may load various instructions included in an operating system and various programs for implementing the game logic into the main memory 12 from the storage 15, and may execute instructions included in the loaded programs. The main memory 12 may be used to store instructions to be executed by the processor 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the processor 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the client terminal 30 via the network 20.

The storage 15 may be formed of, for example, a magnetic disk drive and store various programs such as a game control program for implementing the game logic. The storage 15 may also store various data used in the game. The various data that may be stored in the storage 15 may also be stored on a database server communicatively connected to the server 10 and physically separate from the server 10. Although the storage 15 is illustrated as a single unit in FIG. 15, the storage 15 may be configured as a collection of physically separated storages. In other words, data stored in the storage 15 may be stored in a single storage or stored decentrally in more than one storage.

In an embodiment, the server 10 may be a web server for managing a web site including a plurality of hierarchical web pages. The client terminal 30 may fetch HTML data for rendering these web pages from the server 10 by executing a browser 60 by the processor 31 and analyze the fetched HTML data to render a game screen on a display of the client terminal 30. A user may provide various inputs to the client terminal 30 terminal via the game screen thereby to issue an instruction to operate a user character or select a menu to progress the game. The storage 15 may store the HTML data for rendering the web page. The HTML data may be composed of HTML code written in a markup language such as HTML. The HTML code may be associated with various images. Additionally, the HTML data may include programs written in script languages such as ActionScript™ and JavaScript™. In the above-described manner, the server 10 may manage the web site for providing game services and deliver web pages constituting the web site in response to a request from the client terminal 30, thereby progressing the game. A game provided mainly through such a web page is sometimes called a browser game.

In another embodiment of the disclosure, a game application program 65 may be executed on the client terminal 30 in an execution environment such as an OS or middleware, such that the game application program and the server 10 may cooperate with each other to provide an online game. The game application program 65 may be stored on, e.g., a storage 15 or a storage 25 and downloaded onto the client terminal 30 in response to a request from the client terminal 30. The game application program may include an instruction set for processing game data provided by the server 10 when the client terminal 30 executes the program. Moreover, various data including image data and the like which may be referred at the time of execution of the instruction set may be also downloaded in the client terminal 30. The game application program 65 may be stored on the storage 15 and other storages not shown other than the external storage 25.

The game application program 65 activated on the client terminal 30 may send various game messages to the server 10. The server 10 may process messages from the game application programs in accordance with predetermined game logic and return various information indicating a result of the processing to the game application program, thereby to control the progress of the game.

Thus, the game application program (or instructions included in the program) is executed on the client terminal 30 such that the functions of the game application program and the functions of the server 10 cooperate with each other to progress the game. A game provided through such game application programs is sometimes called an application game. The present invention can be applied to both browser games and application games.

Although the server 10 is illustrated as a single unit in FIG. 1, the server 10 may be configured as a collection of more than one physically separated server. In other words, compositions of the server 10 shown in FIG. 1 may be distributed to different servers. Moreover, the functions which the server 10 executes as described above with reference to FIG. 1 may be alternatively performed by more than one server. Thus, the server 10 may refer to a physically unitary server or a collection of physically separate servers.

Next, the client device 30 will be described below. The client terminal 30 according to an embodiment of the disclosure may be any information processing device including an execution environment (for example, the browser 60) of a browser game for rendering web pages of a game web site fetched from the server 10 on a web browser and/or an application execution environment for the executing game application program 65. Non-limiting examples of the client terminal 30 may include mobile phones, smartphones, tablet terminals, personal computers, electronic book readers, wearable computers, and game consoles.

As shown, the client terminal 30 according to an embodiment of the disclosure may include a processor 31, a main memory 32, a user interface (I/F) 33, a communication I/F 34, and a storage 35, and these components may be electrically connected to one another via an bus (not shown).

The processor 31 may load various programs such as an operating system into the main memory 32 from the storage 35, and may execute instructions included in the loaded programs. The main memory 32 may be used to store instructions to be executed by the processor 31, and may be formed of, for example, a dynamic random access memory (DRAM).

The user I/F 33 may include an information input device for receiving inputs from the user and an information output device for outputting an operation result of the processor 31A; and the user I/F 33 may include a display device such as a liquid crystal display having a touch screen. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the network 20.

The storage 35 may comprise, for example, a magnetic disk drive or a flash memory and store various programs such as an operating system. When receiving the game application program 65 from the server 10 via the communication I/F 34, the storage 35 may store the received game application program 65.

The client terminal 30 may execute the browser 60 by the processor 31 and interpret a file in a HTML format (HTML data) to render a display screen. The client terminal 30 can display the generated display screen on a display unit such as a touch panel and the like provided on the client terminal. With the function of the browser 60, the HTML data obtained from the server 10 can be interpreted and a web page corresponding to the received HTML data can be displayed. The browser may interpret scripts written in the HTML data and can perform processing according to the scripts.

In the client terminal 30, the game application program 65 may be launched in accordance with the operation by the user and executed on a platform implemented on the client terminal 30. When a game application program is executed on the client terminal 30, for example, animation or an operation icon designated by the program may be displayed on a screen of the client terminal 30. The user may enter an instruction for progressing the game through the user I/F 33 of the client terminal 30.

Game items stored in the server 10 and a deck of game items according to an embodiment of the disclosure will be now described. In online games provided by the server 10, various game items such as electronic cards, items, and virtual currency used in the games may be used. The term "game item" is a general term for virtual items used by a user in a game and may include, for example, cards, characters, equipment items such as weapons and armors, and avatars. In an embodiment of the disclosure, the game items may be obtained, owned, used, managed, exchanged, fused, reinforced, sold, discarded, and/or presented by users in the games in accordance with progression of the games; and the use of the game items is not limited to those explicitly described herein. The game item may have, for example, attribute information assigned thereto (e.g., "rarity" "level," "attack ability" "defense ability," and "the name of the game item") to be referred to in the progression of the game as required. At least part of these attribute information may be updated in accordance with progression of the game. In the card games, a user can use one or more his own cards to fulfill a mission or combat other users or non-user characters, thereby progressing the game.

The game items used in various embodiments of the disclosure may be managed in units called decks by server 10. A finite number of game items may be included in each deck and each user may obtain a game item from the deck allocated to the user. Users can progress games by using obtained game items. Each user may have separate decks. In other words, a deck allocated to a user may be used exclusively by the user and other user cannot access to the deck. A deck of game items may be different for each user; or the same deck of the game items may be allocated to two or more different users.

The storage 15 of the server may store a management table (hereunder may be referred to as a "deck management table") for managing deck identification information to identify the deck allocated to each user in association with user identification information identifying the user. FIG. 2 shows an example of the deck management table according to an embodiment of the disclosure. As shown, the deck management table may store one or more pieces of deck identification information that identifies the deck allocated to a user in association with the user identification information that identifies the user. In the management table shown in FIG. 2, for example, deck identification information "B000001" and "B100001" is stored in association with the user identification information "000001." Although one or two decks are allocated to each user in the embodiment of FIG. 2, three or more decks may be allocated to each user. Furthermore, two or more decks may be allocated to each user from the start of a game or allocated in response to a predetermined event occurrence to the user in the game. For example, one deck may be allocated to a user at the start of a game and two or more new decks may be additionally allocated to the user when an item with a rarity value equal to or higher than a predetermined value is selected.

The "user identification information" may be an identification code that identifies a user of a game and may be composed of, for example, a decimal six-digit number. The code system of the user identification information is not limited to those explicitly described herein and may be configured desirably. Thus, the user identification information may be unique to each user and identify the user in a game. The "deck identification information" may be an identification code that identifies a deck used in the game, and may consist of, for example, an alphabetic character and a decimal six-digit number. The code system of the deck identification information is not limited to those explicitly described herein and may be configured desirably.

In one embodiment, information about game items in each deck (hereunder may be referred to as "in-deck game item information") may be stored in a management table (hereunder may be referred to as a "game item management table") that manages the information in association with the deck identification information of the deck. FIG. 3 shows an example of the game item management table according to an embodiment of the disclosure. The game item management table may be stored on, for example, the storage 15. FIG. 3 illustrates management tables for the decks identified by the deck identification information "B000001" and "B100001" respectively stored in association with the user identification information "000001" in the management table of FIG. 2. In the example of FIG. 3, the deck identified by the deck identification information "B000001" may include five types of game items (cards A to E) identified by the game item identification information "I000001" to "I000005". The deck identified by the deck identification information "B100001" may include five types of game items (the card A, and cards G to J) identified by the game item identification information "I000001" and "I000011" to "I000014". The two or more decks allocated to a user may include the same type of game items (in the example of FIG. 3, the card A overlaps) and may include different types of game items.

In one embodiment of the disclosure, each deck may be configured to include at least one game item that has a rarity value equal to or higher than a predetermined value. The game item having a rarity value equal to or higher than a predetermined value may be hereunder referred to as a "rare item." In the example of FIG. 3, the deck B1 and the deck B2 both may include a game item with the rarity value of 4 or higher. When referring to the example of FIG. 3, game items with the rarity value of 4 or higher may be referred to as rare items. In the example of FIG. 3, the card D and the card I are the rare items. Each deck may include any number of rare items.

The game item management table stores the "rarity value," "the total number of the game item in the deck," and "the number of the remaining game items" in the deck in association with the game item identification information ("I000001" to "I000005") that identifies the game items in the deck. The "game item identification information" may be an identification code that identifies a game item (or the type of the game item) owned by a user and may be composed of, for example, an alphabetic character and a decimal six-digit number. The code system of the game item identification information is not limited to those explicitly described herein and may be configured desirably.

The "rarity value" of a game item is an indicator that indicates unavailability of the game item, this indicator having a value ranging from "1" to "4" in the example shown in FIG. 3. For instance, a game item with a lower rarity value is more easily obtained and a game item with a higher rarity is more difficult to obtain.

For example, in the example shown in FIG. 3, as the rarity value of one type of game items increases, the total number of the game items of that type in the deck may be set smaller. The "total number" of a game item in a deck represents the number of the game item accommodated in the deck in an initial state. As the rarity value of one type of a game item increases, "the total number of the game item" in the deck may be decreased. For instance, in the example of FIG. 3, the total numbers of the "card A" that has the lowest rarity value of "1" and the "card E" that is identified by the game item identification information "I000005" in a deck are both set to "50" whereas the total number of the "card D" that has the highest rarity value of "4" is set to "one (1)." Thus, if a game item is randomly selected from the deck of game items in the initial state of the deck, the probability that the card D is selected is fiftieth part of the probability that the card A is selected.

The "number of a remaining game item" in the deck represents the number of the game item remaining in the deck after allotted game items (described later) are provided to a user. Among the game items in the deck identified by the deck identification information "B000001" (hereunder may be referred to as a "deck B1"), a game item selected as an allotted game item may be provided to a user and deleted from the deck B1. The "number of the remaining game item" in the deck may be calculated by subtracting the number of the game item provided to the user from the "total number" of the game item in the deck. The number of remaining game item in the deck thus calculated is stored in a domain of the "number of the remaining game item" in the in-deck game item information management table.

The "name" of a game item represents a name assigned to the game item. The "name" is an example of game item attribute information representing an attribute of a game item. Although omitted from FIG. 3, various game item attribute information other than the "name" may be stored in the in-deck game item information management table. Game item attribute information may include, for example, images of game media, attribute values assigned to the game item such as attack ability and defense ability, and experience points obtained by using the game media in the game. These various information may be stored in the in-deck game item information management table.

FIG. 3 shows in-deck game item information stored in association with deck identification information "B000001." Likewise, in-deck game item information for other deck identification information may be also stored in association with identification information of each deck. The in-deck game item information associated with other decks may be either the same as or different from that of deck B1.

In one embodiment of the disclosure, the storage 15 may store a management table (hereunder may be referred to as an "owned game item management table") for managing one or more game items owned by a user in a game in association with user identification information that identifies each user. FIG. 4 shows an example of the owned game item management table. As shown, the owned game item management table may store game item identification information that identifies five types of game items owned by a user and the owned number of each of the game items in association with the user identification information that identifies the user. In FIG. 4, "N/A" represents that no game item is owned.

Next, functions of the server 10 according to an embodiment will be described. The server 10 according to an embodiment can realize functions by causing the processor 11 to execute various instruction sets. The instruction sets executed by the processor 11 according to the embodiment may include a game control module 41, a deck determination module 42, a selection module 43, an update module 44, a fusion module 45, and an information presenting module 46.

The game control module 41 according to an embodiment of the disclosure may provide various game data to the client terminal 30. For example, when the game control module 41 receives, from the client terminal 30, a control signal indicating that a certain mission has been cleared, the game control module 41 may provide the game application with various parameters related to a mission subsequent to the cleared mission.

The deck determination module 42 according to an embodiment of the disclosure may determine from which deck an acquisition request for a game item is made based on the acquisition request for the game item received from the client terminal 30. For instance, the client terminal 30 may be configured to generate an acquisition request including various information in response to operation by a user, and send the generated acquisition request to the server 10. The acquisition request generated by a user may include the user identification information that identifies the user, deck designation information that specifies a certain deck among more than one deck allocated to the user, the acquisition count designation information that specifies the number of game items to be obtained, and so on. The deck determination module 42 may determine a deck from which a game item is obtained based on the acquisition request. For example, when an acquisition request from a user U1 identified by the user identification information "0000001" is received, the deck designation information included in the acquisition request may be referred and thereafter it is determined whether the request needs to obtain a game item from which one of the two decks allocated to the user (either the deck B1 identified by the deck identification information "B000001" or the deck B2 identified by the deck identification information "B100011").

The selection module 43 according to an embodiment of the disclosure may select, in response to an acquisition request from a user, a predetermined number of game items from among game items included in each of the decks allocated to the user as allotted game items. For instance, when the acquisition request from the user U1 is received, a predetermined number of game items may be selected as the allotted game items from each of the deck B1 identified by the deck identification information "B000001" and the deck B2 identified by the deck identification information "B100011" allocated to the user U1. When three or more decks are allocated to a user, allotted game items may be selected from each of the three or more decks or allotted game items may be selected from two or more of the three or more decks.

In one embodiment of the disclosure, the number of allotted game items selected from the deck B1 (hereunder may be referred to as a "first allotted count") and the number of allotted game items selected from the deck B2 (hereunder may be referred to as a "second allotted count") may be not equal and determined based on from which deck the user wishes to obtain a game item, which would be indicated in the acquisition request. For instance, when the deck determination module 42 determines that an acquisition request indicates acquisition of game items from the deck B1 based on the deck designation information included in the acquisition request from the user U1, the first allotted count may be set larger than the second allotted count. To the contrary, when the deck determination module 42 determines that the acquisition request indicates acquisition of game items from the deck B2, the second allotted count may be set larger than the first allotted count. More specifically, when the acquisition request from the user U1 requests five game items from the deck B1, the number of game items to be obtained from the deck B1 (the first allotted count) may be set to the number (5) designated by the acquisition request, and the number of game items to be obtained from the deck B2 (the second allotted count) may be set to a number smaller than the number set to the first allotted count, for example, may be set to one (1). The specific examples of the first and second allotted counts herein described are merely examples and various numbers may be set to the first and second allotted counts.

When an acquisition request from the user U1 requests to obtain a game item from the deck B1, the selection module 43 according to an embodiment of the disclosure may select allotted game items from the deck B2 such that selected game items from the deck B2 do not include a rare item (a "card I" in the example of FIG. 3) in the deck B2. To the contrary, when the acquisition request from the user U1 requests to obtain game items from the deck B2, the selection module 43 may select allotted game items from the deck B1 such that selected game items from the deck B1 do not include a rare item (a "card D" in the example of FIG. 3) in the deck B1. In other words, when the selection module 43 selects allotted game items from a deck (an undesignated deck) other than the deck designated by an acquisition request from a user, the selection module 43 selects items other than a rare item in the undesignated deck.

In an embodiment, allotted game items may be randomly selected from the game items in the deck. In the example embodiment shown in FIG. 3, the total number of the in-deck game items is 92 (there are 32 cards A, 21 cards B, 9 cards C, 1 card D, 29 cards E, the total number of the cards is 92). Therefore, the allotment probability of each game item is one ninety-second. In this case, game items with the larger remaining numbers are more likely to be selected as allotted game items. For example, the game card A and game card E, having a low rarity value, are more likely to be selected because the large number of these cards remain; conversely, the card D, having a high rarity value, is less likely to be selected because its remaining number is small. Thus, in the example of FIG. 3, game items with larger rarity values remain in smaller counts in the deck and are less likely to be selected as allotted game items.

The selection module 43 according to an embodiment of the disclosure may select one or two or more allotted game items depending on the acquisition count designation information included in an acquisition request from a user. As described above, a user can include the acquisition count designation information that designates the number of game items which the user wishes to obtain in the acquisition request. In this case, the count of game items which the user wishes to obtain may be set to a desired natural number equal to or smaller than the total number of remaining game items in the deck. In one embodiment, a user may allow to input the number of game items which the user wish to obtain on a game screen for generating an acquisition request. In another embodiment, acquisition of all the game items in the deck may be requested, if selected by the user. In this case, the server 10 may send to the client terminal 30 a web page for generating and sending an all-game items acquisition request for acquiring all the game items in the deck.

When the selection module 43 selects allotted game items from among game items in a predetermined deck based on an acquisition request from a predetermined user, the update module 44 according to one embodiment of the disclosure may delete the allotted game items from the predetermined deck and the allotted game items are imparted to the predetermined user. For instance, when the selection module 43 selected three cards A, one card B, and one card C from the deck B1 illustrated in FIG. 3 and further selected one card A from the deck 2, the "remaining number of the game item" of the card A in the deck B1 is reduced from "32" to "29," and the "remaining number of the game item" of the card B is reduced from "21" to "20," the "remaining number of the game item" of the card C is reduced from "9" to "8," and the "remaining number of the game item" of the card A in the deck B2 is reduced from "41" to "40." In this manner, the allotted game numbers selected by the selection module 43 may be removed from the decks B1 and B2. Thus, the update module 44 may delete the allotted game items selected by the selection module 43 from the deck, so as to update at least a part of the in-deck game item information associated with the deck.

Moreover, the update module 44 may update the owned game item management table (see FIG. 4) in order to impart the allotted game items to the user. More specifically, in the same manner as the above example, when the selection module 43 selected, from the deck B1, three cards A, one card B, and one card C as the allotted game items, and further selected one card A from the deck B2, the number of the card A associated with the user identification information "000001" that identifies the user U1 is changed from "8" to "12," the number of the card B is changed from "5" to "6," and the number of the card C is changed from "1" to "2" in the owned game item management table. Thus, when the same game item as one or more game items already owned is selected as allotted game item, the update module 44 increase the owned number of the game items by the number of the game items selected as the allotted game items. When a game item not owned by the user U1 is selected as an allotted game item, game item identification information that identifies the allotted game item is stored in association with the user identification information "000001" of the user U1. For example, in the example shown in FIG. 4, when the card D is selected as an allotted game item in response to a game item acquisition request from the user U1, the domain of "owned item 5" associated with the user identification information "000001" may store the game item identification information "I000004" that identifies the card D and the owned number thereof "1."

The owned game item management table may also be updated in accordance with progression of the game in cases other than the case where an allotted game item is selected by the selection module 43. For instance, when a user obtains a game item by playing a game, the obtained game item is managed in association with the user identification information of the user. The update module 44 according to an embodiment of the disclosure may update the owned game item management table to reflect the user's action when the user uses or consumes a certain game item or give a game item to other user. For instance, when a certain game item is consumed as a fusion material, the owned number of the game item is reduced by the consumed number of the game item in the owned game item management table.

The fusion module 45 according to an embodiment of the disclosure may fuse two or more items obtained from more than one deck allocated to a user in response to a request from the user, and may then generate another game item (a "fused item") or raise the ceiling on an attribute value of a rare item. The fusion module 45 may be able to fuse, for example, the card D which is a rare item obtained from the deck B1 and the card I which is a rare item obtained from the deck B2 to generate a different item. Moreover, the fusion module 45 may be able to fuse the card I (a base card) which is a rare item obtained from a deck C1 and the card I (a fusion material) obtained from a deck C2 in order to raise the ceiling of the attribute values and to increase the current attribute values of the base card I. The item after the fusion may have, for example, advantageous attribute values (for example, a high attack ability, a high defense ability) compared to the fusion material. Since a user can generate a game item with a higher attribute value by fusing a game item with a rare item obtained from a different deck in the above-described manner, the user may be motivated to obtain another rare item from a different deck even after the user obtained a rare item from one of the decks allocated to the user. Alternatively or additionally to the above feature, the fusion module 45 according to one embodiment may fuse two or more rare items to generate a fused item that has a higher attribute value than that of the fusion material only when rare items obtained from different decks to each other are fused. Moreover, the fusion module 45 may fuse two or more rare items such that an attribute value of the fused item obtained by fusing rare items obtained from different decks becomes higher than an attribute value of a fused item obtained by fusing rare items obtained from the same deck. In this case, since a user cannot generate a fused item that has an advantageous attribute value by fusing rare items obtained from the same deck, it is possible to motivate the user to obtain a rare item from different decks.

The information presenting module 46 according to an embodiment may provide the client terminal 30 with any information included in the in-deck game item information managed in the deck management table (see FIG. 2). For example, the information presenting module 46 may generate a web page including some or all of "rarity value," "name," "the total number of the game items in the deck," and "the remaining number" stored in the in-deck game item information management table, and provide the generated web page to the client terminal 30. The information presenting module 46 may provide the client terminal 30 with the in-deck game item information about all the types of the game items included in the deck or may provide the client terminal 30 with the in-deck game item information about some types, of game items (for example, rare items) included in the deck. Here, when the in-deck game item information about some types of game items are provided, the total number of remaining game items in the deck may be additionally provided to the client terminal 30 thereby a user may be able to estimate acquisition probabilities of the some types of game items. Furthermore, the count of the game item which the user obtained may be displayed instead of the "remaining number."

Figure 5:
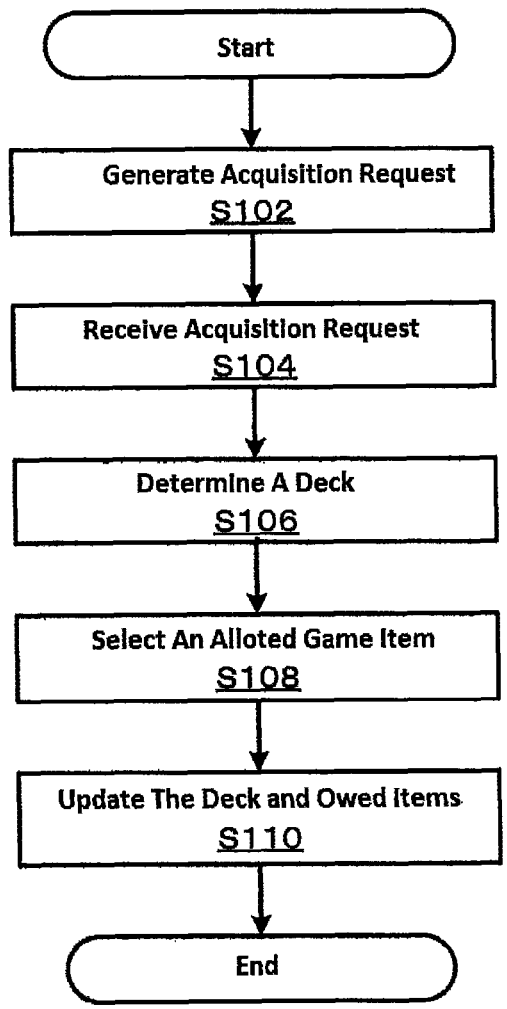
FIG. 5 is a flow diagram showing a process of selecting allotted game items according to an embodiment of the disclosure.

Next, an example of process of selecting allotted game items according to an embodiment of the disclosure will be described with reference to FIG. 5. FIG. 5 is a flow diagram schematically illustrating a process to receive an acquisition request for a game item from a user, and to impart an allotted game item to the user based on the acquisition request. Here, described is an example in which allotted game items are selected from the deck B1 and the deck B2 allocated to the user U1 based on an acquisition request from the user U1.

Figure 6:
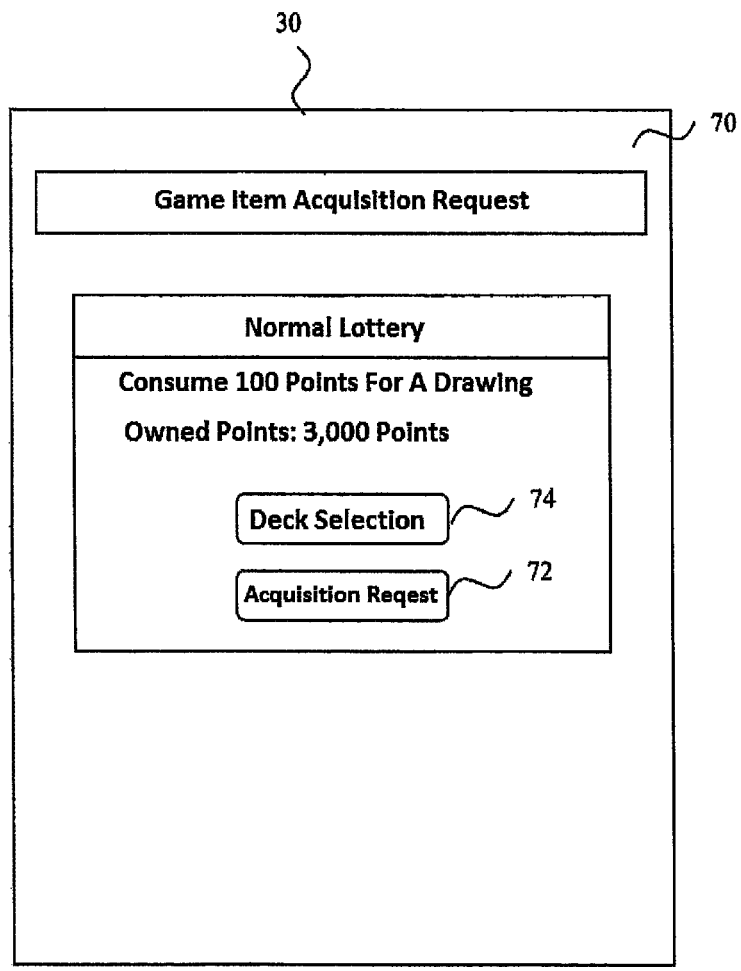
FIG. 6 illustrates an example of a display screen for prompting a user to generate a lottery request according to an embodiment of the disclosure.

In a step S102, a user playing a game may firstly operate the client terminal 30 to generate an acquisition request for obtaining a game item. At this point, an acquisition request screen 70 as illustrated in FIG. 6 may be displayed on the client terminal 30. The acquisition request screen 70 may include an operation button 72 to allow the user U1 to confirm generation of an acquisition request and an operation button 74 to allow the user to select a desired deck among from the decks allocated to the user U1.

When the operation button 74 is selected by the user, choices indicating the decks allocated to the user U1 (the "deck B1" and the "deck B2) are displayed to allow the user to select one or more decks from among the choices of the decks displayed. Upon the operation button 72 on the acquisition request screen 70 is selected by the user by operating the client terminal 30, an acquisition request for obtaining a game item may be generated and the generated acquisition request may be sent to the server 10. The acquisition request may include, for example, the user identification information of the user U1, the deck designation information that designates selected decks, and the acquisition count designation information that designates the number of game items which the user wish to obtain. Generation of the acquisition request in the step S102 may be performed by, for example, the above-described browser 60 and/or game application 65.

The acquisition request sent from the client terminal 30 of the user U1 may be received by the server 10 in a step S104. Then it may be determined from which deck the game item is requested to be obtained, in order words, which deck is designated, based on the received acquisition request in a step S106. When the acquisition request includes the deck designation information, which deck is designated can be determined based on the deck designation information. The determination of the deck from which the game item is obtained is carried out by, for example, the above-described deck determination module 42.

Based on the acquisition request from the user U1 received in the step S104, a predetermined number of game items are selected as allotted game items from among game items included in the decks allocated to the user U1. For instance, the deck B1 and the deck B2 are allocated to the user U1 as illustrated in the example of FIG. 2, and when the acquisition request designates the deck B1, the first allotted count of game items are selected as the allotted game items from among game items in the deck B1, and the second allotted count of game items are selected as the allotted game items among from game items in the deck B2, here the first allotted count is smaller than the second allotted count. When the acquisition request includes the acquisition count designation information, the first allotted count may be set to the count designated by the acquisition count designation information. When the deck B2 is designated by the acquisition request, the total allotted counts of both decks may be determined such that the number of game items selected from the deck B1 (the first allotted count) may be set smaller than the number of game items selected from the deck B2 (the second allotted count)

The server device 10 may store game points earned in the game by each user and points that can be used in a plurality of games and purchased from a game provider, in association with the user identification information of the users. The server device 10 may update points such as game points stored in association with the user identification information of the user U1 based on the game item acquisition request received from the user U1. More specifically, in the example of FIG. 6, 100 points of the game points are consumed for a single acquisition request. Thus when an acquisition request generated on the web page shown in FIG. 6 is received, 100 points may be deducted from the game points which the user U1 owns. The selection of allotted game items in the step S108 may be performed by, for example, the above-described selection module 43.

Next, in a step S110, the game items selected as the allotted game items from the decks in the step S108 may be deleted from the decks. Moreover, in the step S110, the game items selected as the allotted game items from the decks in the step S108 may be added as the game items which the user U1 owns. More specifically, for example, when three cards A, one card B, and one card C are selected as allotted game items from the deck B1 and one card A is selected as an allotted game item from the deck B2, the "number of the remaining" card A may be decreased by three, the number of the remaining" card B may be decreased by one, and the number of the remaining" card C may be decreased by one in the deck management table of the deck B1, and the "number of the remaining" card A may be decreased by one in the deck management table of the deck B2. The owned game item management table (see FIG. 4) may be updated such the number of owned card A by the user U1 may be increased by four, and the number of owned cards B and C by the user U1 may be increased by one respectively. The update of decks and owned game items in the step S110 may be performed by, for example, the above-described update module 44.

Figure 7:
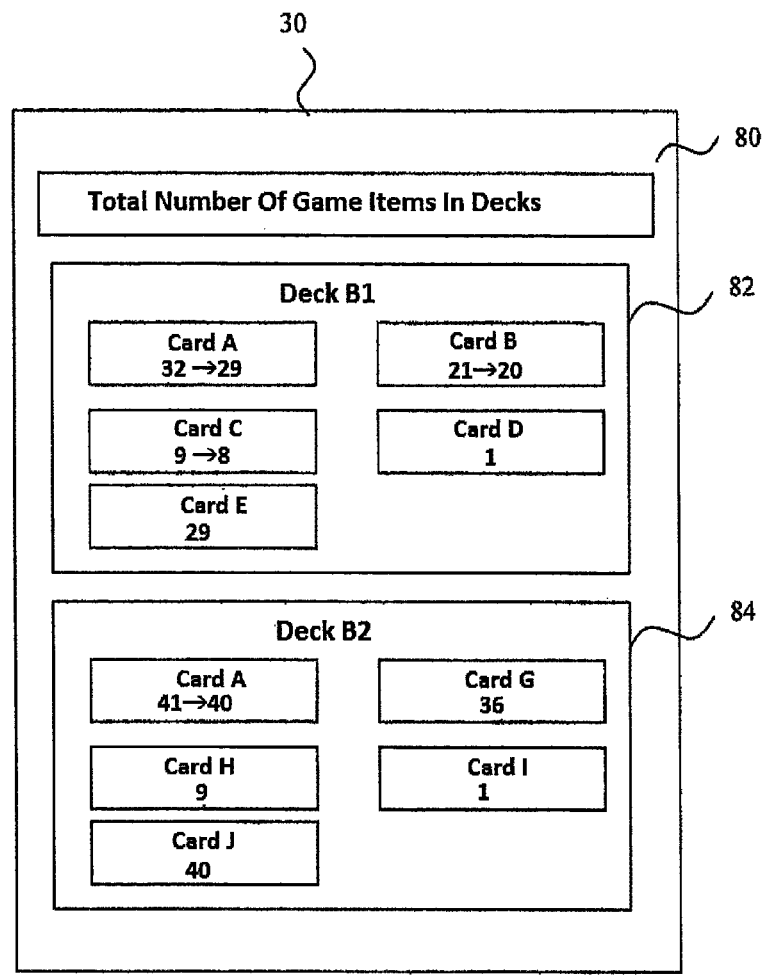
FIG. 7 shows an example of a display screen to show the in-deck game item information according to an embodiment of the disclosure.
Figure 8:
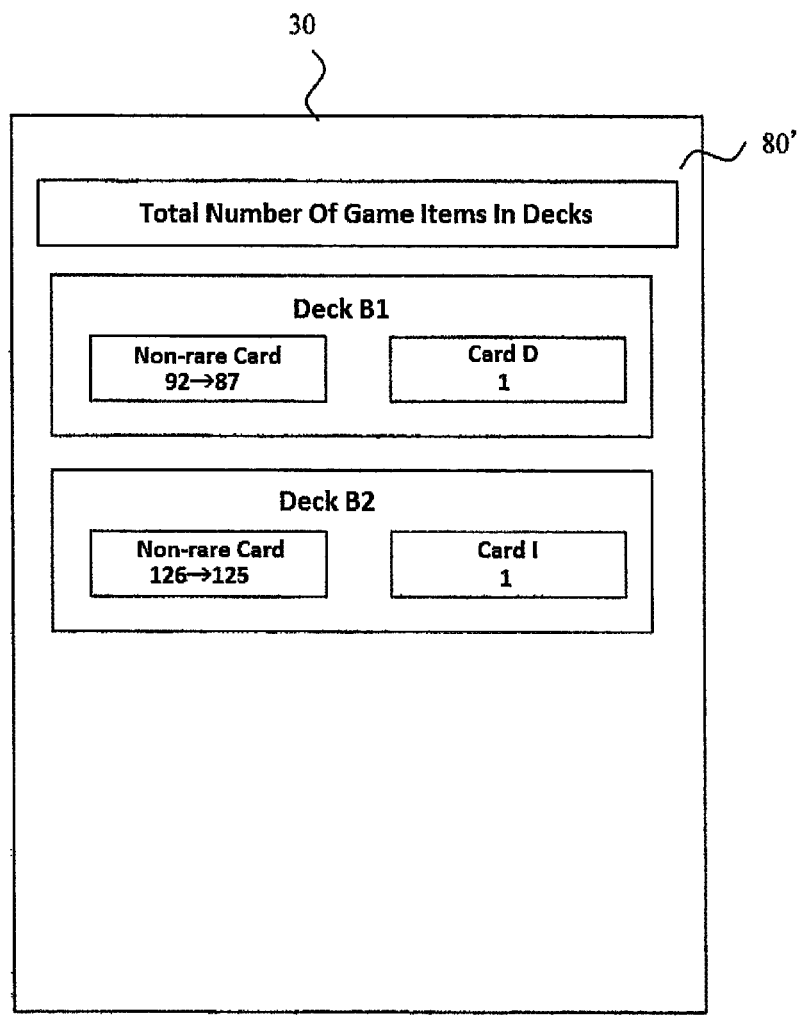
FIG. 8 shows an example of a display screen to show the in-deck game item information according to another embodiment of the disclosure.

After the in-deck game item information is updated in the step S110, the updated in-deck game item information may be provided to the user U1. FIG. 7 illustrates an example of a display screen including the in-deck game item information. A display screen 80 may be displayed on, for example, a display of the client terminal 30. As illustrated in FIG. 7, the display screen 80 includes the in-deck item information about game items remaining in each deck after the update. More specifically, names of the game items remain in the deck are shown in association with the remaining number of the game items for each deck. In the example of FIG. 7, the in-deck game item information about the game items in the deck B1 is shown in a region 82, and the in-deck game item information about the game items in the deck B2 is shown in a region 84. In addition to the names and the remaining numbers of game items, the display screen 80 may include any types of the in-deck game item information. For example, in addition to the remaining number of each game item, the total number of all the game items may be included on the screen. Moreover, instead of the names of the game items, rarity values of the game items may be displayed. In this case, since the card A and the card E have the same rarity value of "1," the display region for the deck B1 may show, for example, "the rarity value '1', the number of the cards 61→58." Furthermore, each of different game items remaining in each deck may not be necessarily shown individually. As illustrated in a display screen 80' shown in FIG. 8, only for rare items, the number of remaining game items (for example, the card D and the card I) is shown individually, and for game items other than the rare items, the total number of all the game items other than the rare items may be shown. In addition, the remaining number and the total number in the deck may be shown side by side on the display screen of FIGS. 7 and 8. Since the remaining numbers and the total numbers of game items in the deck may be displayed in association with each other, it is possible to understandably present to a user what proportion of game items among all the game items in the deck have already been selected as allotted game items (or deleted from the deck). Moreover, the number of the game item which have been already selected (in other words, a difference between the "total number of in-deck game items" and the "remaining number") may be displayed for each type of game items or each of game items having the same rarity values.

As described above, according to the embodiment of the disclosure, allotted game items are selected from each of the decks allocated to a user in response to an acquisition request from the user, and the selected allotted game items are removed from the corresponding decks. Therefore, for example, when the user U1 designates the deck B1 (or the deck B2) to perform an acquisition request and successfully obtains a rare item in the deck B1 (or the deck B2), a given number of allotted game items are also deleted from the deck B2 (or the deck B1). Thus, when the user U1 finishes obtaining desired game items such as rare items from, for example, the deck B1, the user U1 is able to use the deck B2 in an initial state from which a predetermined number of game items are already removed. The deck B2 from which a predetermined number of game items are removed has a higher acquisition probability than that of the deck B2 in the initial state. Therefore, according to one embodiment of the disclosure, even after a user has obtained desired game items from one deck, the user is motivated to obtain game items from another deck.

Moreover, the user U1 can strategically consider from which deck the user should obtain game items based on the remaining numbers of game items in the deck B1 and the deck B2 when the user performs an acquisition request. For example, if the remaining numbers of the game items in the deck B1 and the deck B2 allocated to the user U1 are those shown in FIG. 7, the user U1 may be required to determine to which deck the user should perform an acquisition request based on the remaining numbers and the current status of the game which the user U1 plays. For instance, when a user prioritizes the card D which is a rare item in the deck B1 to obtain, it may be a reasonable strategy to concentrate acquisition requests to the deck B1. When a user aims to obtain both the card D in the deck B1 and the card I in the deck B2, it may be a reasonable strategy to perform acquisition requests firstly to the deck B2 of which remaining number of game items larger than that of B1 in order to equalize the remaining number of the both decks. As described above, according to the embodiments of the disclosure, users are required to think strategically to obtain rare items and this makes a game more attractive compared to conventional games in which users can only increase the number of acquisition requests to obtain game items.

A part or all of the functions performed by the processor 11 shown in FIG. 1 may also be executed by the processor 31 of the client terminal 30 or a processor of any other device, and some or all of the functions of the processor 31 may also be executed by the processor 11 of the server 10 or a processor of any other device.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

With respect to the use of substantially any plural and/or singular terms herein, those having skill in the art can translate from the plural to the singular and/or from the singular to the plural as is appropriate to the context.

What is claimed is:

1. A server device for providing via a network a game to be played using game items to a plurality of terminals, individual ones of the terminals being operated by a user and allocated one or more decks of the game items, the server device comprising:
   a storage storing information about a finite number of game items included respectively in a first deck and a second deck allocated to a user, wherein the first deck includes a first rare item having a rarity value equal to or higher than a predetermined value, and the second deck includes a second rare item having a rarity value equal to or higher than the predetermined value; and
   one or more processors executing prescribed computer readable instructions to:
      in response to an acquisition request from the user, select a first allotted count of game items as first allotted game items from among game items in the first deck;
      remove the game items selected as the first allotted game items from the first deck;
      in response to the acquisition request from the user, select a second allotted count of game items as second allotted game items from among game items in the second deck;
      remove the game items selected as the second allotted game items from the second deck; and
      impart the first and second allotted game items to the user.

2. The system of claim 1, wherein the one or more processors are configured to determine whether the acquisition request is a first acquisition request for obtaining a game item in the first deck or a second acquisition request for obtaining a game item in the second deck,
   wherein when the acquisition request is the first acquisition request, the first allotted count is larger than the second allotted count.

3. The system of claim 2, wherein when the acquisition request is the second acquisition request, the first allotted count is smaller than the second allotted count.

4. The system of claim 1, wherein the one or more processors execute prescribed computer readable instructions to present, to the user, information indicating a total number of game items included in the first deck in an initial state, information indicating a remaining number of the first rare item, information indicating a total number of game items included in the second deck in an initial state, and information indicating a remaining number of the second rare item.

5. The system of claim 1, wherein the one or more processors execute prescribed computer readable instructions to generate another game item based on the first rare item obtained from the first deck and the second rare item obtained from the second deck.

6. The system of claim 1, wherein the one or more processors are configured to determine whether the acquisition request is a first acquisition request for obtaining a game item in the first deck or a second acquisition request for obtaining a game item in the second deck,
   when the acquisition request is the first acquisition request, the second allotted game items are selected such that they do not include the second rare item, and
   when the acquisition request is the second acquisition request, the first allotted game items are selected such that they do not include the first rare item.

7. A method implemented by executing prescribed computer readable instructions by one or more processors, comprising:
   storing, by one or more processors, information about a finite number of game items included respectively in a first deck and a second deck allocated to a user, wherein the first deck includes a first rare item having a rarity value equal to or higher than a predetermined value, and the second deck includes a second rare item having a rarity value equal to or higher than the predetermined value;
   in response to an acquisition request from the user, selecting, by one or more processors, a first allotted count of game items as first allotted game items from among game items in the first deck;

removing, by one or more processors, the game items selected as the first allotted game items from the first deck;

in response to the acquisition request from the user, selecting, by one or more processors, a second allotted count of game items as second allotted game items from among game items in the second deck;

removing, by one or more processors, the game items selected as the second allotted game items from the second deck; and imparting, by one or more processors, the first and second allotted game items to the user.

8. A storage medium storing a program causing one or more computer processors to function as:

a unit configured to store information about a finite number of game items included respectively in a first deck and a second deck allocated to a user, wherein the first deck includes a first rare item having a rarity value equal to or higher than a predetermined value, and the second deck includes a second rare item having a rarity value equal to or higher than the predetermined value; and a unit configured to select a first allotted count of game items as first allotted game items from among game items in the first deck in response to an acquisition request from the user;

a unit configured to remove the game items selected as the first allotted game items from the first deck;

a unit configured to select a second allotted count of game items as second allotted game items from among game items in the second deck in response to the acquisition request from the user;

a unit configured to remove the game items selected as the second allotted game items from the second deck; and a unit configured to impart the first and second allotted game items to the user.

* * * * *